INVENTOR.
CHARLES TARRATS
BY
Herzig, Walsh & Blackham
ATTORNEYS

INVENTOR.
CHARLES TARRATS
BY
Herzig, Walsh & Blackham
ATTORNEYS

United States Patent Office 3,450,950

Patented June 17, 1969

3,450,950

GRID ELECTRICAL INTERCONNECTING SYSTEM

Charles Tarrats, 121 N. Bixel St., Los Angeles, Calif. 90026

Filed Oct. 18, 1966, Ser. No. 587,618
Int. Cl. H02b *1/04;* H05k *1/04*
U.S. Cl. 317—101 5 Claims

ABSTRACT OF THE DISCLOSURE

A means of effecting electrical connection between printed circuits on opposite sides of a perforated circuit board and between members of a set of circuit boards wherein the perforations receive removable connector clips having lateral contact elements engageable with portions of the printed circuits bordering the margins of a selected hole; and the circuit boards are insertable in frames carrying other contacts; the frames, in turn, being insertable in slots provided in the housing.

*Summary of the invention*

This invention relates to an improved grid type contacting or interconnecting means for facilitating the making of interconnections between large numbers of electrical circuit members in order to complete desired electrical circuits, and to achieve their related functions. The system of the invention involves a basic unit which is a grid having coordinate electrical verticals and horizontals which are electrically connectable at the points of intersection, as will be described in detail hereinafter. To accommodate large numbers of circuit interconnections, the grid would have to be very large. To avoid the necessity of having a grid having undesirably large dimensions, a plurality of grid units is provided of relatively small size. The grid units are constructed so that they can be slid or moved into a frame or holder and coupled together so that, in effect, one large grid is formed in which all electrical interconnections are made between verticals and horizontals.

The grid package or assembly might be said to have the function of a terminal box and to provide an alternative to terminal box structure. The invention has wide application wherever it is necessary or desirable to make connections between large numbers of electrical circuit members. The invention has particular application, however, in connection with telephone PBX systems and the exemplary form of the invention will be described herein as adapted in a telephone PBX system.

As indicated in the foregoing, a frame or cabinet is provided into which individual grid units may be slid and coupled together. All verticals of the grid units may be coupled together and all horizontals of grid units may be coupled together, or there may be other coupling arrangements as described more in detail hereinafter. In the exemplary form of the invention, all incoming circuit pairs from the telephone central station may be connected to grid verticals and the grid horizontals may be connected to on-site circuitry to provide whatever service features are desired. The verticals and horizontals of individual grid units are connected to multiple circuit plugs or to connecting blocks. The connector plugs may be dual, embodying both male and female sections. The purpose of this is to make it possible to interconnect or couple all of the verticals, for example, of a grid unit to an adjacent grid unit, and to, at the same time, accommodate making connection of the verticals to incoming circuitry. Jumper cables are provided with end coupling plugs or connectors for coupling grid units to each other for multiplying them. Such jumper cables are provided in appropriate lengths for the purpose.

In telephone line distribution systems, hundreds of conductor pairs may be carried from a main office to a selected distribution point in a single cable where it is tied into a terminal box. Such boxes may have several hundred input terminals to which the pairs of wires in the main cable are connected and several hundred output terminals to which telephone service line circuits are connected. To make changes in existing telephone service, or to add additional service or features, changes are made in the connections between the terminals in the terminal box and customarily this has been accomplished by the use of jumpers, that is, electrical leads connected between terminals. Making the connections by way of jumpers has many serious drawbacks. It becomes difficult to identify terminals and to make the correct jumper connections and the jumpers tend to become a disordered mass of wiring which is very difficult to handle.

The primary object of this invention is to make it possible to serve the purposes described in the foregoing, that is, mainly, to make desired interconnections between many circuit members entirely without the use of jumpers. The system of the invention makes it possible to rearrange lines, pickups and/or key telephone features merely by rearranging the elements which provide interconnection between the horizontals and verticals of the grid at the intersections. For this purpose, a novel and simplified type of connecting clip is provided which is insertable through holes at the point of intersection of the verticals and horizontals, as will be referred to more in detail presently. With the system as described herein, an installer can very easily add or remove lines on a telephone installation without using any jumper wires in the entire system. The installation of PBX key systems can be accomplished in greatly reduced time. The rearrangement of lines and change in location of telephone sets can be accomplished in much less time. Ordinarily, with conventional systems, the rearrangement of the system usually entails re-running large numbers of jumpers. With the system of the invention as described herein, every phone has access to every feature that the entire system has, and to every feature that the system will ever have no matter how much it grows.

The implementation of the concept of the invention involves novel and unique constructional features in the grid units themselves and in the manner of making interconnections. In the preferred form of the invention, each grid unit is a section of rigid insulating material having electrical vertical circuit members on one side formed by printed circuitry and electrical horizontal circuit members on the other side formed by printed circuitry. Holes are provided in the insulative grid member at the points of intersection of the verticals and horizontals whereby electrical interconnection can be made between verticals and horizontals. The printed circuitry on the surfaces of the insulative member includes generally circular areas around each hole on both sides of the insulative sheet or slab. The interconnections are made by way of novel connection members in the form of spring clips. These elements are neither male nor female connectors, but might be said to be neutral; no male or female connector, as such, is required. Preferably, the connector is in the form of a spring clip having extending spring fingers, the spring clip being insertable through a hole in a position such that these spring fingers engage on opposite sides of the insulative sheet in contact with the printed circuits adjacent to the periphery of the hole. By means of this novel construction of the connector element, the need for male and female pins or connectors is eliminated and, further, no additional element is required for making the interconnection other than the clip itself and the printed circuitry on the surface of the grid unit or grid board. The accomplishment of these purposes and ends constitutes a further object of the invention.

Further objects and many additional advantages of the invention will become apparent from the following detailed description and annexed drawings wherein.

Figures 1, 2, 3:
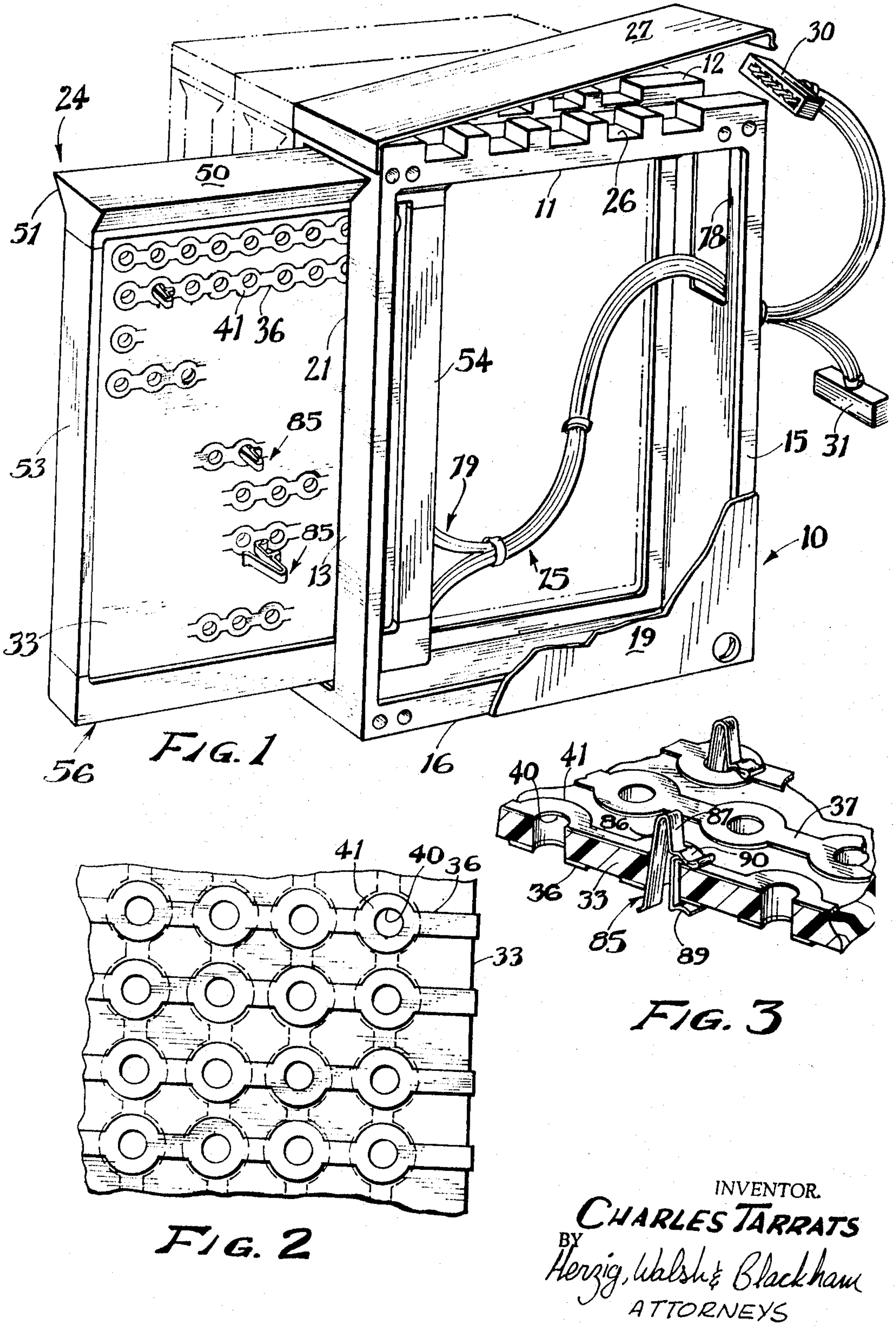
FIGURE 1 is a perspective view of a preferred form of the grid assembly of the invention.
FIGURE 2 is a detail view of a section of a grid board or unit.
FIGURE 3 is a detail perspective view of a part of a grid board or unit showing connector clips in position.

Referring now more in detail to the drawings, numeral 10 designates generally a grid assembly or grid package. As described in the foregoing, this assembly is constructed to provide a relatively compact unit embodying individual grid units which are interconnected in such a way that they constitute a single, large coordinate grid having vertical and horizontal electrical conducting elements. The package of FIGURE 1 comprises a generally rectangular frame or housing having top members 11 and 12, side frame members 13 and 15 and a bottom member 16. The front of this frame or housing may be left open or may be covered by a cover sheet, or plate 19 attached by screws. The left side of the housing is open as shown at 21 to receive the grid unit which can be slid into and out of the housing. The grid unit is designated generally at 24. The top of the frame or housing 10 comprises the members 11 and 12 having spaced rectangular recesses in them as designated at 26. Overlying these members is a top cover 27 which can be lifted as shown to provide access to the recesses 26. The recesses 26 serve the purpose of accommodating the placement and retention in them of connector plugs, such as designated at 30 and 31, as will be referred to more in detail presently.

Referring to the grid unit 24, it is formed from a rigid rectangular sheet of suitable insulating material as designated at 33. Various known and available commercial materials are suitable for the purpose. Printed circuitry is provided on both sides of the sheet of insulating material 33 to form vertical electrical circuit members on one side and horizontal electrical circuit members on the other side. Numeral 36 designates one of the horizontal printed circuits and numeral 37 designates one of the vertical printed circuits. See FIGURE 3. At the intersections of the vertical and horizontal circuit members, holes are provided in the board 33 as designated at 40. The printed circuitry is formed so that it has a generally round formation adjacent each of the holes 40 as designated at 41. The manner of making electrical interconnection between the horizontals and verticals will be described presently.

Figure 6:
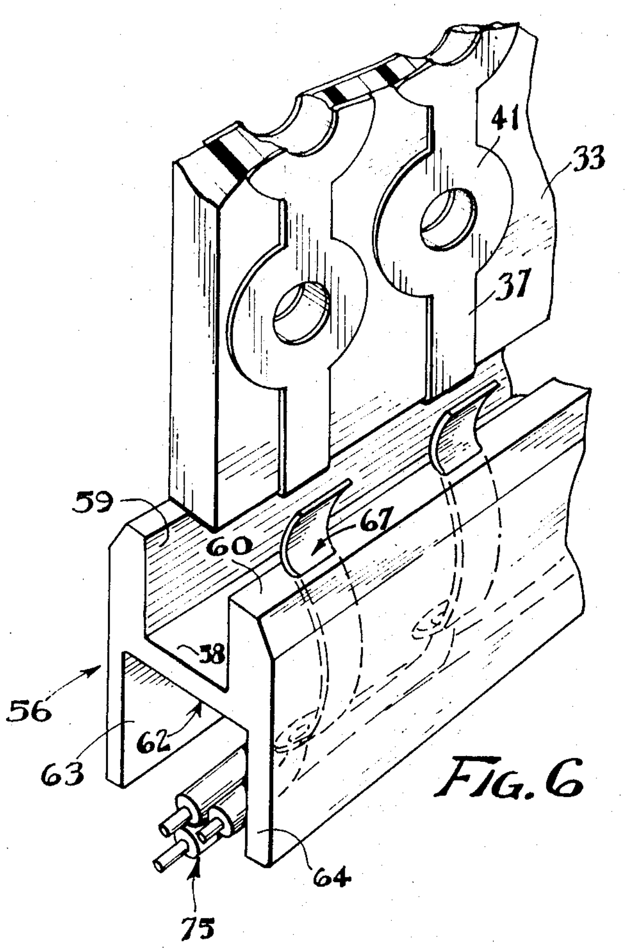
FIGURE 6 is a detail perspective view illustrating the construction of a grid unit.

A frame, similar to a picture frame, is provided around the border of each of the grid units 24. The grid unit 24 has a top frame member as designated at 50 having bevelled side edges as shown at 51. The grid unit 24 has side frame members 53 and 54, which engage the edges of the coordinate board 33 and interfit with the other frame members. The bottom frame member is designated at 56 and is shown more in detail in FIGURES 6 and 7. This frame member is generally rectangular in cross-section having an upper channel 58 having side walls 59 and 60. It also has a lower or bottom channel 62 having side walls 63 and 64. The frame members of the grid unit may be made of any suitable material, such as molded plastic, or other appropriate materials. The coordinate board 33 of the grid unit 24 is received in and fits into the upper channel 58 of the lower frame member 56, as may be seen in FIGURES 6 and 7. Formed in or molded into one side of the lower frame member 56 are a plurality of spaced spring clip members, such as designated at 67. Preferably, these spring clip members are formed or molded in the side part 60 of the frame member 56. These spring clip members have an upper bowed end part as designated at 70, and a lower end part as designated at 71 extending into the lower channel 62. The clips 67 are spaced at intervals along the side of the frame member 56 so that the ends 70 of the spring clip members come into contacting engagement with the vertical printed circuit elements 37, as may be observed in FIGURES 6 and 7.

Figure 7:
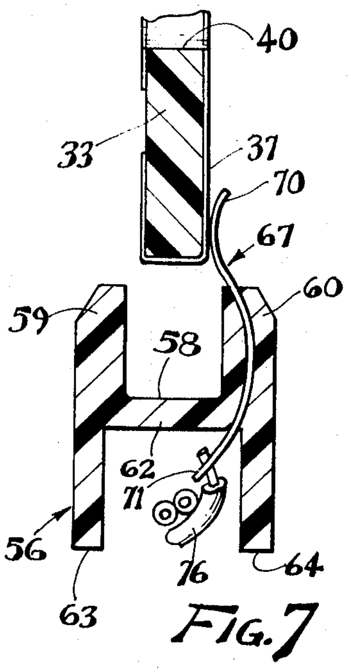
FIGURE 7 is a detail sectional view further illustrating the construction of the grid unit of FIGURE 6.

The lower channel 62 of the frame member 56 forms a passageway or a raceway for a group of electrical conductors 75. The spring clips 67 are each individually connected to one of the conductors 75, as illustrated in FIGURE 7, wherein the end part 71 of the clip 67 is electrically connected to one of the wires 76. The wires 75 which connect to the vertical electrical members of the grid unit 24, are grouped in a group, as shown in FIGURE 1, and may be led out through an opening 78 in an end wall 15 of the housing 10 to connect to a connector plug 31.

The frame member 54 of the grid unit 24 is constructed similarly to the frame member 56 which has been described in detail. Connections are made to individual horizontal printed circuit elements in the same manner, these connections being made to a similar group of wires as designated at 79 in FIGURE 1, which group of wires is also led out through the opening 78 and may connect to a connector plug 30. As previously mentioned, either one or both of the plugs 30 and 31 may be of a dual type embodying both a male plug and a female receptacle. The purpose of having plugs of this type is to accommodate making interconnections between, for example, all of the verticals of a grid unit to all of the verticals of an adjacent unit, and at the same time making connections to service lines.

From the foregoing description of the exemplary embodiment, it will be understood that the plug 31 may be interconnected with another plug, for example, connecting to incoming lines from a telephone central station. The plug 30 may interconnect horizontals of one grid unit 24 to another similar grid unit and may also provide for interconnection to the one-site circuitry to provide such service and features as are desired. It should be understood also that the groups of wires 75 and 79 will not necessarily connect to plugs, such as shown at 30 and 31, but may be led to connecting blocks suitably situated having terminals to which other connections can be made.

Figure 4:
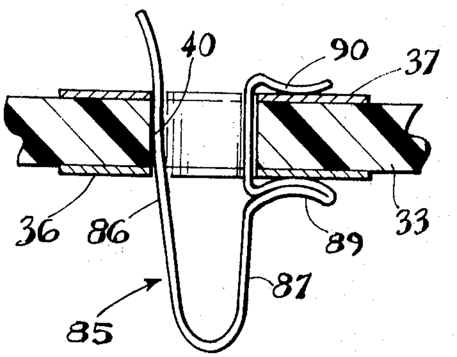
FIGURE 4 is a detail view of one of the connector clips in position in the board.
Figure 5:
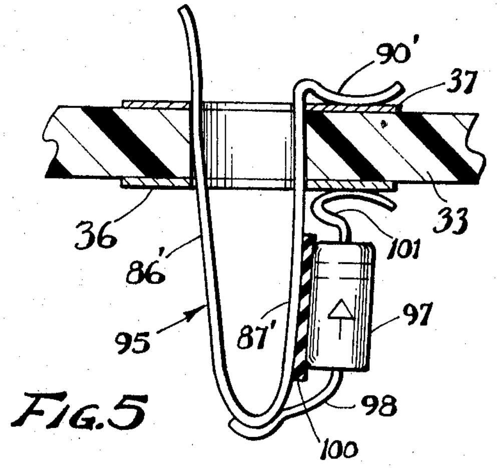
FIGURE 5 is a detail view of a modified form of connector clip having a solid state electrical component embodied therewith.

FIGURES 3, 4 and 5 show a preferred construction of the clip or contactor means for making electrical interconnection between the horizontals and verticals of the grid unit 24. Numeral 85 designates one of the connector clips. It comprises a bowed section of conductive spring metal having side legs 86 and 87, as best seen in FIGURE 4. Preferably, the leg 87 is deformed to be folded back on itself to provide an extending spring finger 89 and the end of this leg is bent back to provide a second spring finger 90. The spring fingers 90 and 89 are spaced an amount substantially equal to the thickness of the grid board 33. To make the interconnection between horizontal and vertical printed circuits, the clip 85 need only be grasped in the fingers and compressed to force the legs 85 and 87 towards each other. The clip is then inserted through the hole 40 until these spring fingers 89 and 90 are opposite the surfaces of the grid board 33. The clip is then released and the spring fingers 89 and 90 come into contact with the vertical and horizontal printed circuit elements 36 and 37 on the surface of the board and the spring fingers 89 and 90 retain the contactor clip in position. It will be observed that the spring clip 85 is neither a male or female connector member and may be considered as a neutral member. No socket or receptacle is required to receive the connector clip. It is merely inserted through the hole in the board 33, as described, and its extending spring fingers provide the contact and connection between the vertical and horizontal printed circuitry.

FIGURE 5 shows a slightly modified form of contact clip 95 which is similar to the clip 85 except as follows. Similar parts of the spring clip are identified by similar reference numerals primed. Numeral 97 designates a miniature solid state electrical component such as a diode. The diode has a spring connector 98 at one end which is attached to the clip 95, such as by soldering or the like. The component 97 is spaced from the leg 87′ of the clip 95 by an insulator 100. At the other end of the component 97 is a spring contactor 101 which serves the purpose of the spring finger 89 of the clip 85. It comes into contacting and holding engagement with the printed circuit element 36, the spring finger 90′ coming into contact with the printed circuit element 37 on the other side of the board 33. It will be observed that the component 97 is in series with the electrical circuit formed by the interconnection of the horizontal printed circuit element 36 and the vertical printed circuit element 37. In this manner the spring clip contactors or connectors can be put in position while at the same time introducing any desired electrical component in series in the circuit.

From the foregoing, those skilled in the art will understand the nature of the invention and its utilization. As described in connection with the exemplary embodiment, the grid system or package 10 may be installed or placed at any location where it may be desired to make large numbers of interconnections between electrical circuits, or changes in such interconnections, such as referred to by way of example in connection with telephone PBX systems. The grid unit 24 may be made relatively small so as to be easy to fabricate and handle. By assembling a plurality of such units in the frame or housing 10 of the package, a grid of any desired dimensions may be realized in a small compact assembly. In this manner the package accommodates itself to making any number of circuit interconnections. The grid, as a whole, is made up of the individual grid units simply by interconnecting all of the verticals of one grid to adjacent grids, as described, and interconnecting all of the horizontals of a grid to adjacent grids, as described. All incoming circuitry may connect to grid horizontals, for example, and this may be accomplished as described merely by plugging in a plug. As may be observed, therefore, service embodying any desired feature may be realized simply by drawing out one or more of the slides formed by the grid units 24, and making the desired interconnections between horizontals and verticals simply by inserting spring connector clips. Original installation of service is greatly facilitated and simplified both from the standpoint of equipment used and time requred. The equipment, as described, as will be observed, is extremely versatile, also from the standpoint of rearranging service features. This system accommodates itself ideally to the expansion of the volume of service at any particular site since it is only necessary to provide increased numbers of slides or grid units like the unit 24. The concept, as will be understood, is that of a single coordinate grid, which is made compact by providing the smaller individual grid units 24 which are interconnected so as to constitute, electrically, a single coordinate grid.

From the foregoing, those skilled in the art will observe that the invention achieves and realizes all of the objects and advantages as set forth in the foregoing, as well as having many additionl advantages that are apparent from the detailed description and foregoing summary.

The foregoing disclosure is representative of a preferred form of the invention and is to be interpreted in an illustrative rather than in a limiting sense and the invention to be accorded the full scope of the claims appended hereto.

What is claimed is:

1. Circuit interconnecting means comprising:

(a) a printed circuit board having holes therethrough at preselected locations, and printed circuits on opposite surfaces thereof, the printed circuits having conductor portions bordering said holes;

(b) removable contactors inserted in selected holes electrically interconnecting said printed circuits;

(c) removable frame members on at least two side edges of said board;

(d) and resilient contactor elements carried by said frame members providing electrical contact with selected portions of said printed circuitry on the board.

2. A structure, as defined in claim 1, which further comprises:

(a) a plurality of electrical conductors having electrical connection individually to said contactor elements.

3. A device, as defined in claim 1, which further includes:

(a) a housing having openings therein receiving a plurality of said circuit boards whereby the grid units may be moved into and out of the housing;

(b) and means to accommodate said electrical conductors.

4. A device, as defined in claim 1, wherein:

(a) each of said frame members has a channel formed therein an edge of receiving and said circuit board, and said contactor elements are positioned alongside said channel for contact with the printed circuitry when the frame member is in position on the board.

5. A device, as defined in claim 4, wherein:

(a) each frame member includes a raceway for electrical conductors.

References Cited

UNITED STATES PATENTS

| | | | |
|---|---|---|---|
| 2,586,854 | 2/1952 | Myers. | |
| 2,747,169 | 5/1956 | Johanson. | |
| 2,883,447 | 4/1959 | Dahl | 174—68.5 |
| 2,963,626 | 12/1960 | Du Val et al. | |
| 2,972,727 | 2/1961 | Flanagan et al. | 339—220 XR |

DARRELL L. CLAY, *Primary Examiner.*

U.S. Cl. X.R.

29—626, 629; 174—68.5; 339—18, 256